United States Patent Office 3,575,810
Patented Apr. 20, 1971

3,575,810
METHOD FOR REMOVAL OF SIDE CHAIN
OF SAPOGENINS
Takashi Matsushima, 52 Wakamatsu-cho, Santanda, Amagasaki-shi, Japan, and Takashi Mitsugi, 697–9 Tonoki, Takaishi-cho, Senboku-gun, Japan
No Drawing. Filed July 9, 1968, Ser. No. 743,274
Claims priority, application Japan, July 19, 1967,
42/46,467, 42/46,468, 42/46,469, 42/46,470
Int. Cl. C07c *167/18*
U.S. Cl. 195—51
8 Claims

ABSTRACT OF THE DISCLOSURE

Androstane derivatives wherein the D-ring is as follows:

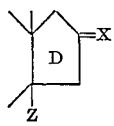

X being =O or

Z being H or OH; configuration of Z is either $\alpha$ or $\beta$, are obtained by the removal of the side chain of a steroidal sapogenin or its derivatives of the partial formula:

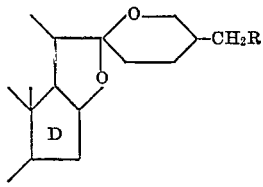

or

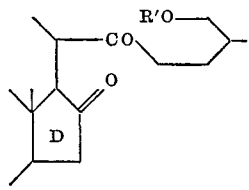

wherein R is H or OR' group; R' is H or an acyl group, by the action of a microorganism of the Gymnoascus, Scopulariopsis, Hypomyces and Dendrostilbella genus. The androstane derivatives are useful as intermediates for preparing a wide variety of androstane and estrane compounds including testosterone, estrone, estradiol, etc. in per se known manner.

---

The present invention relates to a method for removal of the side chain of steroidal sapogenins. More particularly, it relates to the concept of microbiological process for transformation of spirostane series steroidal sapogenins into 16-oxygenated androstane compounds, which comprises subjecting a steroidal sapogenin or its derivatives to the fermentative action of a microorganism capable of effecting the removal of side chain at position 17 of steroidal sapogenins, specifically that belonging to genus Gymnoascus, Scopulariopsis, Hypomyces and Dendrostilbella, to afford the 16-oxygenated androstane compounds.

It is a general object of the present invention to provide a new microbiological transformation of spirostane series sapogenins. It is another object to provide a new route for production of the androstane series steroidal intermediates from the steroidal sapogenins or their derivatives. Another object is to provide an industrially available excellent production method of androstane series intermediates from naturally occuring abundant steroidal materials. Another object is to utilize a novel microbiological transformation in the steroidal partial synthesis. Another object is to provide new high yield conversion process of spirostane steroids into androstane steroids consisting of a single microbiological treatment. Another object is to provide novel androstane compounds. These and other objects will be apparent from the following disclosures.

The process of the present invention can illustratively be represented by the following reaction scheme represented by the partial formulae including isomers at positions $C_{20}$, $C_{22}$ and $C_{25}$ and excluding A, B and C rings of steroidal nucleus, wherein R is a hydrogen atom or OR' group; R' is a hydrogen atom or an acyl group; X is an oxo group or a group

Z is a hydrogen atom or a hydroxy group, by action of effective microorganisms belonging to genus Gymnoascus, Scopulariopsis, Hypomyces and Dendrostilbella.

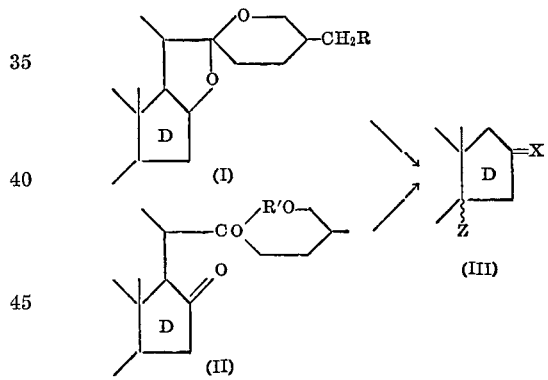

The starting materials of the present invention are the steroid compounds having partial formula either I or II. The steroid nucleus of the starting materials may possess additional substituent(s) on rings A, B and/or C. Typical of the substituents include hydroxyl group, acyloxy group, oxo group, unsaturated bonds, and the like. Especially, the following compounds can be utilized as the starting materials in the present invention: agapanthagenin, agavogenin, botogenin (gentrogenin), cacogenin, chlorogenin, cholegenin, cologenin, correllogenin, 9(11)-dehydrohecogenin, 9(11)-dehydromanogenin, diosgenin, diosgenone, gitogenin, hecogenin, isocholegenin, isorhodeasapogenin, jimogenin, kammogenin, kitigenin, kogagenin, kryptogenin, dihydrokryptogenin, lilagenin, lubigenin, magonenin, manogenin, marcogenin, metagenin, metagenone, mexogenin, neobotogenin, neochlorogenin, neohecogenin, neoruscogenin, neotigogenin, nogiragenin, rhodeasapogenin, ricogenin, rockogenin, ruscogenin, samogenin, sarsasapogenin, sisalagenin, smilagenin, tigogenin, anhydrodehydro-$\Delta^{3,5}$-tigogenin, tokorogenin, willagenin, yamogenin, yonogenin, yuccagenin and their dehydro and dihydro derivatives and acyl esters thereof, which are summarized by the following general formula indicating partial structure inclusive of rings A, B and C.

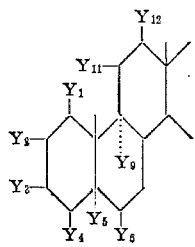

wherein $Y_{1-12}$ each represents a hydrogen atom, a hydroxyl group, an acyloxy group or, excluding $Y_5$ and $Y_9$, represent an oxo group and when $Y_{1-12}$ each is a hydrogen atom, a hydroxyl group or an acyloxy group, they each may be accompanied with an unsaturation between the neighbouring carbon atom; each configuration of $Y_{1-12}$ is α or β except for $Y_9$ as α.

As the acyl group cited above, methoxycarbonyl, ethoxycarbonyl, formyl, acetyl, propionyl or the like can be illustrated.

Generally, the dehydrogenated and dehydrated derivatives among these substrates (especially, $\Delta^4$-3-oxo or $\Delta^{1,4}$-3-oxo derivatives) and the compounds having partial Formula II are transformed more easily and can be utilized as inducer in order to facilitate the transformation of the other starting materials. The said inducer is a compound which promotes formation of adaptive enzyme or strengthens the enzyme system of the microorganisms and results in increase in efficiency of the microorganisms.

As for the micororganisms capable of effecting the removal of side chain at position 17 of steroidal sapogenins or their derivatives utilized in the present invention, there is exemplified by those belonging to genus Gymnoascus, Scopulariopsis, Hypomyces and Dendrostilbella. Preferred examples of them include *Gymnoascus reessii, G. sudans, G. setosus, G. umbrinus, G, subumbrinus, G. brevisetosus, G. candidus, Scopulariopsis sphaerospora, S. fusca, S. rhodogena, S. capsici, S. albo-flavescens, S. croci, S. rufulus, S. blochii, Hypomyces haematococcus, H. ipomoeae, H. rosellus, H. slonai, Dendrostilbella byssina, D. baemycioides, D. macrospora, D prasinula* and the mutants or variations thereof or closely related species or related strains.

In order to obtain desirable growth of microorganisms belonging to the above mentioned genus, a nutrient medium is used, which is consisted of suitable carbon sources, organic or inorganic nitrogen sources and inorganic salts conventionally used in fermentation techniques. Carbon sources may be glucose, sucrose, dextrin, starches, glycerol, etc., organic nitrogen sources may be peptone, casein, lact-albumin hydrolysate (Edamin, Scheffield Enzymatic), casein hydrolysate (N-Z amine), yeast, yeast extract (Difco), corn steep liquor, water extract of soy bean oil meal, fish soluble and the like, and inorganic nitrogen sources, ammonium nitrate, ammonium phosphate, ammonium sulfate, sodium nitrate and other inorganic salts capable of maintaining pH level of reaction medium between the range preferable for fermentation and the co-factors necessary for growth of the microorganisms.

The propagation of the microorganisms belonging to genus Gymnoascus, Scopulariopsis, Hypomyces and Dendrostilbella may be carried out in a suitable nutrient medium by stationary culture, but more preferably by shaking, stirring or submerged culture with aeration. The condition of propagation—i.e. duration, temperature, pH, composition of nutrient medium or the like—may be selected from the conventional order suitably depending on the nature and quantities of the starting materials.

After the propagation of the microorganism, the living cells in the broth medium may be brought to contact with the starting material which may be added as a solution or suspension in a solvent such as acetone, methanol, ethanol, ethylene glycol, propylene glycol, dimethyl formamide or the like, non-toxic toward the organism in the concentration employed, with or without the presence of detergent or surface active agent, under aerobic and sterile condition.

Alternatively, the process of the present invention may be carried out in an under nutrient or nutrient lack medium. For example, the reaction can be carried out in a suspension of mycelium including spore in a nutrient-lack medium such as distilled water, common water, a buffer solution saline water or the like. The mycelium is obtained from treatment of microorganism which comprises preculturing for suitable period in a suitable nutrient medium to propagate, collecting mycelium by a conventional manner such as filtration, centrifugation or the like, followed by washing with distilled water, a buffered solution or the like to remove contaminated liquid substances on need.

Instead of the mycelium, a homogenate of the mycelium or the enzymatic extract or enzyme preparation thereof, which are obtainable by the conventional method from the mycelium, may be utilized in this invention.

It is to be understood that the condition of the process of the present invention—i.e. duration, temperature, pH, composition of the medium or the like—can be selected to attain the best results depending on the nature and concentration of the starting material and microorganism utilized. Usually, duration of 1–7 days, temperature of 20–35° C., pH of 4–8 are preferably selected. These figures are those of a few instances and does not restrict the scope of this invention.

In many cases, the microorganisms belonging to the above cited genus does not only remove the 17-side chain of spirostane compounds, but simultaneously induces the other oxidative changes on the A–C rings or substituents therein, for example, hydroxylation, hydrolysis, dehydration, oxidation, dehydrogenation, etc. These changes are sometimes more preferable for utilization of products of this invention. Among them, a combination of oxidation and dehydrogenation or dehydration which furnishes the products summarized by the following general formula is especially useful:

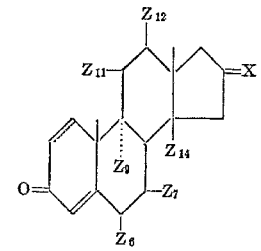

wherein X is an oxo group or a group

$Z_{6-14}$ each is a hydrogen atom, hydroxyl group, acyloxy group or except for $Z_{14}$ and $Z_9$, represent an oxo group, and when $Z_{6-14}$ each is a hydrogen atom or a hydroxyl group; they each may be accompanied with an unsaturation between the neighbouring carbon atoms, whereby each configuration of $Z_{6-14}$ is α or β, except for $Z_9$ as α; broken line represents absence or presence of a double bond. Specific examples of the product of this invention include:

4-androstene-3,16-dione,
1,4-androstadiene-3,16-dione,
16(α and β)-hydroxy-4-androsten-3-one, 16(α and β)-hydroxy-1,4-androstadien-3-one,
11(α and β)-hydroxy-1,4-androstadiene-3,16-dione,
11(α and β)-hydroxy-4-androstene-3,16-dione,
11,16-dihydroxy-4-androsten-3-one, 6-hydroxy-4-androstene-3,16-dione,
6-hydroxy-1,4-androstadiene-3,16-dione,
7-hydroxy-4-androstene-3,16-dione,
7-hydroxy-1,4-androstadiene-3,16-dione,
16-hydroxy-4-androstene-3,12-dione,
16-hydroxy-1,4-androstadiene-3,12-dione,
3,16-dioxoandrost-4-en-12-ol,
12-hydroxy-1,4-androstadiene-3,16-dione,
3,12,16-trioxoandrost-4-ene,
3,12,16-trioxoandrosta-1,4-diene,
14-hydroxy-4-androstene-3,16-dione and the like.

Following the reaction, the reaction products may be recovered by any one of the conventional method in chemical industries. For instance, adsorption with an adsorbent such as alumina, silica gel, infusorial earth (Florisil), active charcoal or the like, followed by elution with a solvent such as petroleum ether, benzene, chloroform, acetone, methanol or the like or extraction of broth, or mycelia and liquid part of broth with organic solvents such as chloroform, methylene chloride, ethylene chloride, esters such as butyl acetate, diethyl ketone, butanol or the like can effectively be utilized. After recovery, the products may be isolated by concentration of the extracts to a small volume or the dryness. Purification of the crude products may be accomplished by the conventional techniques such as counter current distribution method, chromatography over alumina, silica gel or the like, or more conveniently by a simple recrystallization in a conventional manner.

The products of the present invention serve as the valuable intermediates for production of various androstane and estrane series steroidal hormones such as androgens, estrogens, anti-androgens, anti-progestins, anti-estrogens, anti-lipemic agents, anti-DOCA agents or the like (e.g. testosterone, 16-estrone, estriol, estrone, estradiol, 1,3,5 (10)-estratriene-3,16-diol, 3 - hydroxy - 1,3,5(10)-estratrien-16-one and its ketal acylates, 17 - halo - 1,3,5(10)-estratriene-3,16-diol, 17-halo - 3 - hydroxy - 1,3,5(10)-estratrien-16-one, 4 - androstene - 3,16 - dione, 5α-androstane - 3,16 - dione, 11,16-dihydroxy - 16 - ethynyl-4-androsten-3-one, 1,3,5(10)-estratrien - 16 - one, 1,3,5(10)-estratrien - 16 - ol, 16,17 - epithio - 1,4 - androstadien-3-one, etc.). For example, 3,16-dioxoandrosta-1,4 - diene may be converted into antilipemic 16-hydroxyestra-1,3,5 (10)-triene by the process analogous to U.S. Pat. 3,081,-316; 3,16 - dioxoandrosta - 1,4 - diene may be converted into estrogenic 3 - hydroxyestra - 1,3,5(10) - trien - 16-one by action of lithium in the presence of hydrogen donor by the process analogous to that described in J. Am. Chem. Soc. 86, 742 (1964). The product may be converted into antilipemic and estrogenic 3-acylate-17-ketal derivatives as described in U.S. Pat. 3,138,590. The same compound may be converted into estrogenic 17-halo - 3 - hydroxy - 1,3,5(10) - estratrien - 16 - one and alkyl ethers (U.S. Pat. No. 3,079,408) by halogenation at position 17; 16 - hydroxy - 1,4 - androstadien - 3-one may be converted to antideoxycorticosteronic 16,17-epithio-1,4-androstadien - 3 - one by the method apparent from U.S. Pat. No. 3,123,599; 11β - hydroxy - 1,4 - androstadiene-3,16-dione can be converted into useful 11,16-dihydroxy-16-ethynyl-4-androsten-3-one (Belgian Pat. No. 591,544) through 11-hydroxy - 4 - androstene - 3,16 - dione (Chem. Ind., 1962, 300).

The invention will be described in further detail in the following examples which are presented by way of illustration only and not as indicating the scope of the invention. Many variations are possible without departing from the scope of the present invention.

EXAMPLE 1

One hundred milliliters nutrient medium containing 3.5% glucose, 2% peptone and 0.3% corn steep liquor (pH 5.6–5.9) is inoculated with *Gymnoascus reessii* and propagated for 4 days at 27–28° C. with shaking. Then a solution of 10 mg. diosgenone in 1.5 ml. methanol is added into the propagated nutrient medium and propagation is continued for another 5 days. The broth is filtered to obtain mycelium and filtrate, and both of the fractions are extracted separately with ethyl acetate. The extracts are combined and evaporated to remove the solvent. The residue is purified by thin-layer chromatography over silica gel with a mixed solvent of chloroform and ether (30:4) to afford androst-4-ene-3,16-dione, M.P. 146–147.5° C.

IR: $\nu_{max.}^{Nujol}$ 1742, 1669, 1618 cm.$^{-1}$

Yield: ca. 20–30%.

EXAMPLE 2

One hundred milliliters nutrient medium of the same composition as described in Example 1 is inoculated with *Gymnoascus subumbrinus* and propagated for 4 days at 27–28° C. with shaking. Then a solution of 10 mg. diosgenone in 1.5 ml. methanol is added into the propagated nutrient medium and propagation is continued for another 5 days. The cultured medium is filtered to obtain mycelium and filtrate. Both of the mycelium and filtrate are extracted with ethyl acetate. The extracts are combined and evaporated to remove the solvent. The residue is purified by thin-layer chromatography over silica gel with a mixed solvent of chloroform and ether (30:4) to afford 3,16-dioxoandrost-4-ene, M.P. 146–148° C.

IR: $\nu_{max.}^{Nujol}$ 1742, 1669, 1618 cm.$^{-1}$

Yield: ca. 5–10%.

EXAMPLE 3

A nutrient medium (100 ml.) of the same composition as described in Example 1 is inoculated with *Gymnoascus sudans* and propagated for 2 days at 27–28° C. with shaking. Then a solution of 10 mg. diosgenin in 1 ml. ethanol is added into the propagated nutrient medium and shaking is continued for another 5 days. The reaction mixture is treated in the manner similar to Example 1 and resultant extract is purified by thin-layer chromotography over silica gel with mixture of ethyl acetate-toluene (1:1) to give 3,16-dioxoandrost-4-ene, M.P. 147–148° C. Yield: ca. 10%.

EXAMPLE 4

A nutrient medium (100 ml.) of the same composition as described in Example 1 is inoculated with *Gymnoascus brevisetosus* and propagated for 3 days at 27–28° C. with shaking. Then a solution of 10 mg. kryptogenin in 1 ml. acetone is added into the propagated nutrient medium and shaking is continued for another 4 days. The reaction mixture is treated in the manner similar to Example 1 and resultant extract is purified by thin-layer chromatography over silica gel with mixture of ethyl acetate and toluene (1:1) to give 3,16-dioxoandrost-4-ene, M.P. 147–148° C.

EXAMPLE 5

A nutrient medium (100 ml.) of the same composition as described in Example 1 is inoculated with *Gymnoascus umbrinus* and propagated for 4 days at 27–28° C. with shaking. Then a solution of 10 mg. hecogenin in 1.5 ml. methanol is added into the propagated nutrient medium and shaking is continued for another 2 days. The reaction mixture is treated in the manner similar to Example 1 and resultant extract is purified by thin-layer chromatography over silica gel with mixture of ethyl acetate and touene (1:1) to give 3,16-dioxo-12α-hydroxyandrost-4-ene.

EXAMPLE 6

Following the procedure described in Example 1, but substituting *Gymnoascus reessii* with *G. setosus* or *G. candidus*, diosgenone is converted into 3,16-dioxoandrost-4-ene and 3,16-dioxoandrosta-1,4-diene.

EXAMPLE 7

A nutrient medium (100 ml.) of the same composition as described in Example 1 is inoculated with *Scopulariop-*

*sis sphaerospora* and propagated for 5 days at 27–28° C. Then a solution of 10 mg. diosgenone in 1.5 ml. methanol is added into the propagated nutrient medium and the medium is shaken for another 4 days. The broth is extracted with ethyl acetate. The extract solution is evaporated to leave residue which is purified by thin-layer chromatography over silica gel with ethyl acetate-toluene (2:3) to afford 3,16-dioxoandrost-4-ene, M.P. 148–148.5° C.

IR: $\nu_{max.}^{CHCl_3}$ 1739, 1668, 1619 cm$^{-1}$; $\nu_{max.}^{Nujol}$ 1742, 1669, 1618 cm.$^{-1}$ Yield: 26%.

EXAMPLE 8

Twenty liters of sterilized nutrient medium containing 3.6% glucose, 2% peptone and 0.3% corn steep liquor and 2–5 ml. of defoaming agent (Nissan Uniol D–2000) (pH 7.0) are added with 600 ml. seed broth of *Scopulariopsis sphaerospora* and propagated with aeration (20 liters/min.; 0.5–0.7 kg./cm.$^2$) and stirring (300 r.p.m.) for 98.5 hours at 27–28° C. The defoaming agent (11–15 ml.) is added during the reaction period. A solution of 2 g. diosgenone in 280 ml. methanol is added into the propagated nutrient medium and propagation is continued for further 3 days at 27–28° C. with aeration (18 liters/min. (gange pressure 0.5–0.7 kg./cm.$^2$)), and stirring (220 r.p.m.). After the reaction. the broth is centrifuged to obtain mycelium and filtrate. Both of the mycelium and the filtrate are extracted separately with ethyl acetate. The combined extract solutions are evaporated to leave residue, which is purified by chromatography over 200 g. silica gel and recrystallization to afford 3,16-dioxoandrost-4-ene, M.P. 154° C. $[\alpha]_D^{22}$ —96.2° (chloroform).

IR: $\nu_{max.}^{Nujol}$ 1742, 1669, 1618 cm.$^{-1}$

*Analysis.*—Calcd. (percent) for $C_{19}H_{26}O_3$: C, 79.68; H, 9.15. Found (percent): C, 79.89; H. 9.14, and 14α-hydroxyandrost-4-ene-3,16-dione, M.P. 207–208° C. $[\alpha]_D^{23}$ —59.1° (chloroform).

UV: $\lambda_{max}^{EtOH}$ 241.5 m$\mu$. IR: $\nu_{max.}^{Nujol}$ 3402, 1744, 1653, 1610 cm$^{-1}$

*Analysis.*—Calcd. (percent) for $C_{19}H_{26}O_3$: C, 75.46; H, 8.67. Found (percent): C, 75.48; H, 8.70.

The yield of the former is ca. 20% and that of the later is ca. 6%. A small amount of the crystal, M.P. 133–134° C. of unknown structure is obtained.

EXAMPLE 9

A nutrient medium (100 ml.) of the same composition as described in Example 7 is inoculated with *Scopulariopsis fusca* and propagated for 5 days at 27–28° C. with shaking. Then a solution of 10 mg. diosgenone in 1.5 ml. methanol is added and propagation is continued for another 4 days. The broth is extracted with ethyl acetate. The extract is evaporated to leave residue which is purified by thin-layer chromatography over silica gel with mixture of ethyl acetate and toluene (2:3) to afford 3,16-dioxoandost-4-ene, M.P. 146–149° C. Yield: ca. 13%.

EXAMPLE 10

A nutrient medium (100 ml.) of the same composition as described in Example 7 is inoculated with *Scopulariopsis sp.* (TM–253) and propagated for 5 days at 27–28° C. with shaking. Then a solution of 10 mg. diosgenone in 1.5 ml. methanol is added and propagation is continued for further 4 days. The broth is extracted with ethyl acetate. The extract is evaporated to leave residue which is purified by thin-layer chromatography over silica gel with mixture of ethyl acetate and toluene (2:3) to afford 3,16-dioxoandrost-4-ene. Yield: ca. 30%.

EXAMPLE 11

A nutrient medium (100 ml.) of the same composition as described in Example 7 is inoculated with *Scopulariopsis rhodogena* and propagated for 4 days at 27–28° C. with shaking. Then a solution of 10 mg. diosgenin in 1.5 ml. methanol is added and propagation is continued for further 7 days. The broth is extracted with ethyl acetate and the extract is evaporated to leave residue which is purified by thin-layer chromatography over silica gel with mixture of ethyl acetate and toluene (2:3) to afford 3,16-dioxoandrost-4-ene. Yield: ca. 10%.

EXAMPLE 12

A nutrient medium (100 ml.) of the same composition as described in Example 1 is inoculated with *Scopulariopsis capsici* and propagated for 5 days at 27–28° C. with shaking. Then a solution of 10 mg. hecogenin in 1.0 ml. methanol is added and propagation is continued for further 4 days. The broth is extracted with ethyl acetate. The extract is evaporated to leave residue which is purified by thin-layer chromatography over silica gel with mixture of ethyl acetate and toluene (1:1) to afford 3,16-dioxo-12α-hydroxyandrost-4-ene. Yield: ca. 20%.

EXAMPLE 13

A nutrient medium (100 ml.) of the same composition as described in Example 7 is inoculated with *Scopulariopsis rufulus* and propagated for 5 days at 27–28° C. with shaking. Then a solution of 10 mg. kryptogenin in 1.0 ml. of methanol is added and propagation is continued for further 4 days. The broth is extracted with ethyl acetate and the extract is evaporated to leave residue which is purified by thin-layer chromatography over silica gel with mixture of ethyl acetate and toluene (2:3) to afford 3,16-dioxoandrost-4-ene and 3,16-dioxoandrosta-1,4-diene.

EXAMPLE 14

Following the procedure described in Example 9 but substituting *Scopulariopsis sphaerospora* with *Scopulariopsis alboflavescens*, *S. croci* and *S. blochii*, diosgenin is converted into 3,16-dioxoandrost-4-ene.

EXAMPLE 15

A nutrient medium containing 3.5% glucose, 2% peptone, 0.3% corn steep liquor are inoculated with *Hypomyces haematococcus* Bork. et Brme Wr. CBS and propagated for 2 days at 27–28° C. Then a solution of 10 mg. diosgenone in 1.5 ml. methanol is added to the propagated medium, and shaken for another 4 days at the same temperature. The broth is extracted with ethyl acetate and the extract solution is evaporated to remove the solvent. Purification of the residue by thin-layer chromatography over silica gel with a mixture of chloroform and ether (30:4) affords 3,16-dioxoandrosta-1,4-diene, M.P. 139–140° C.

IR: $\nu_{max.}^{Nujol}$ 1730, 1658, 1622, 1603 cm.$^{-1}$

Yield: ca. 20%.

EXAMPLE 16

A nutrient medium of the same composition as described in Example 15 is inoculated with *Hypomyces solani* and propagated for 2 days at 27–28° C. Then a solution of 10 mg. diosgenone in 1.5 ml. methanol is added to the medium and shaken for another 6 days at the same temperature. The broth is extracted with ethyl acetate and extract solution is evaporated in vacuo to remove the solvent. Purification of the residue by thin-layer chromatography over silica gel with a mixture of chloroform and ether (30:4) affords 3,16-dioxoandrosta-1,4-diene, M.P. 140–142° C. Yield: ca. 60%.

EXAMPLE 17

A nutrient medium (100 ml.) of the same composition as described in Example 15 is inoculated with *Hypomyces solani* and propagated for 2 days at 26–28° C. Then a solution of 10 mg. hecogenin in 0.5 ml. acetone is added to the propagated medium and cultured for 5 days. The broth is extracted with ethyl acetate, and the extract solution is worked up as described in Example 15 to afford 1,4-androstadiene-3,12,16-trione, M.P. 233–234° C., 12α-hydroxy-1,4-androstadiene-3,16- dione, M.P. 226–227° C. [α]$_D^{23}$ −160.4° (chloroform).

EXAMPLE 18

A nutrient medium (100 ml.) of the same composition as described in Example 15 is inoculated with *Hypomyces rosellus* and propagated for 4 days at 26–28° C. Then a solution of 10 mg. tigogenone in 1.0 ml. methanol is added to the propagated broth and propagation is continued for further 5 days. The broth is extracted with ethyl acetate and the extract is worked up as Example 15 to afford 3,16-dioxoandrost-4-ene and 3,16-dioxoandrosta-1,4-diene accompanied by small amount of 16-hydroxy-androsta-1,4-dien-3-one.

EXAMPLE 19

Following the procedure described in Example 15, but substituting *Hypomyces haematococcus* with *Hypomyces ipomoeae*, diosgenone is converted into 3,16-dioxoandrosta-1,4-diene.

EXAMPLE 20

A nutrient medium containing 3.5% glucose, 2% peptone, 0.3% corn steep liquor (pH 5.6–5.9) is inoculated with *Dendrostilbella byssina* and propagated for 3 days at 27–28° C. Then a solution of 26 mg. diosgenone in 2 ml. methanol is added thereto and shaken for another four days. The nutrient medium is filtered to obtain mycelium and filtrate. Both of the fractions are extracted separately with ethyl acetate and the combined extracts are evaporated to remove solvent. Purification of the residue by thin-layer chromatography over silica gel with mixture of chloroform and ether (30:4) affords 3,16-dioxoandrosta-1,4-diene (ca. 40%), M.P. 140° C.

IR: $\nu_{max.}^{Nujol}$ 1730, 1658, 1622, 1603 cm.$^{-1}$ and 3-oxoandrosta-1,4-dien-16β-ol (ca. 10%), M.P. 198–198.5° C.

IR: $\nu_{max.}^{Nujol}$ 3390, 1654, 1617, 1602 cm.$^{-1}$

EXAMPLE 21

A nutrient medium containing 3.5% glucose, 2% peptone, 0.3% corn steep liquor (pH 5.6–5.9) is inoculated with *Dendrostibella baeomycioides* and propagated for 4 days at 27–28° C. Then 10 mg. diosgenin is added thereto and shaken for another 4 days. The broth is filtered to obtain mycelium and filtrate. Both of the fractions are extracted with ethyl acetate and the combined extract is evaporated to remove the solvent. Purification of the residue by thin-layer chromatography over silica gel with a mixture of chloroform and ether (30:7) affords 3,16-dioxoandrosta-1,4-diene, M.P. 140° C. Yield: ca. 25%.

EXAMPLE 22

A nutrient medium (100 ml.) of the same composition as described in Example 20 is inoculated with *Dendrostilbella macrospora* and propagated for 3 days at 27–28° C. Then a solution of 10 mg. kryptogenin in 1.5 ml. methanol is added and shaken for another 7 days. The broth is extracted with ethyl acetate and extract solution is evaporated and the resulting crude product is purified by chromatography over silica gel with a mixture of ethyl acetate and toluene (1:1) to yield 3,16-dioxoandrosta-1,4-diene.

EXAMPLE 23

A nutrient medium (100 ml.) containing 3.5% glucose, 2% peptone, 0.3% corn steep liquor (pH 5.6–5.9) is inoculated with *Dendrostilbella sp.* (TM–23) and propagated for 3 days at 27–28° C. Then a solution of 30 mg. diosgenone in 2 ml. methanol is added thereto and shaken for another 4 days. The nutrient medium is filtered to obtain mycelium and filtrate. Both of the fractions are extracted with ethyl acetate and the combined extract is evaporated to remove the solvent. Purification of the residue by thin-layer chromatography over silica gel with a mixture of chloroform and ether (30:4) affords 3,16-dioxoandrosta-1,4-diene, M.P. 140° C. Yield: ca. 30%.

EXAMPLE 24

Following the method described in Example 22, but substituting *Dendrostilbella macrospora* with *Dendrostilbella prasinula*, diosgenone is converted into 3,16-dioxoandrosta-1,4-diene, M.P. 140° C.

EXAMPLE 25

A nutrient medium (100 ml.) of the same composition as described in Example 20 is inoculated with *Dendrostilbella byssina* and propagated for 3 days at 27–28° C. Then the broth is filtrated to obtain mycelium, which is suspended in 100 ml. distilled water. The suspension is added with a solution of 10 mg. diosgenone in 1 ml. methanol and shaken for another 3 days. The mixture is extracted with ethyl acetate. The extract solution is evaporated and the residue is purified by thin-layer chromatography over silica gel to afford 3,16-dioxoandrosta-1,4-diene, M.P. 140° C. Yield: ca. 30%.

EXAMPLE 26

A nutrient medium of the same composition as described in Example 20 is added with a solution of 10 mg. kryptogenin in 1 ml. methanol, inoculated with *Dendrostilbella byssina* and propagated for 4 days at 27–28° C. Then a solution of 10 mg. diosgenone in 1 ml. methanol is added into the propagated medium and shaken for another 3 days at the same temperature. The broth is extracted with ethyl acetate and extract solution is evaporated in vacuo to remove the solvent. Purification of the residue by thin-layer chromatography over silica gel with a mixture of chloroform and ether (30:4) affords 3,16-dioxoandrosta-1,4-diene, M.P. 140–142° C. Yield: ca. 50%.

What we claim is:

1. A method for removal of side chain of steroidal sapogenins or their derivatives, which comprises subjecting a steroidal sapogenin or its derivatives having following partial formulae of ring D and side chain of the molecule:

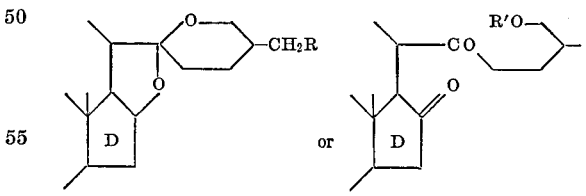

wherein R is a hydrogen atom or OR' group; R' is a hydrogen atom or an acyl group; the assymmetric centers at position 20, 22 and 25 may each have configuration α or β, to the fermentative action of an effective microorganism belonging to genus Gymnoascus, Scopulariopsis, Hypomyces or Dendrostilbella and isolating a compound having following partial formula of ring D of the molecule:

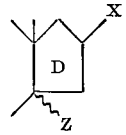

wherein X is an oxo group or a group

Z is a hydrogen atom or a hydroxyl group.

2. A method claimed in claim 1, wherein the steroidal sapogenin and its derivatives are selected from the group consisting of agapanthagenin, agavogenin, botogenin (gentrogenin), cacogenin, chlorogenin, cholegenin, cologenin, correllogenin, 9(11)-dehydrohecogenin, 9(11)-dehydromanogenin, diosgenin, diosgenone, gitogenin, hecogenin, isocholegenin, isorhodeasapogenin, jimogenin, kammogenin, kitigenin, kogagenin, kryptogenin, dihydrokryptogenin, lilagenin, lubigenin, magogenin, manogenin, marcogenin, metagenin, metagenone, mexogenin, neobotogenin, neochlorogenin, neohecogenin, neoruscogein, neotigogenin, nogiragenin, rhodeasapogenin, ricogenin, rockogenin, ruscogenin, samogenin, sarsasapogenin, sisalagenin, smilagenin, tigogenin, anhydrodehydro-$\Delta^{3,5}$-tigogenin, tokorogenin, willagenin, yamogenin, yonogenin and yuccagenin and acylates thereof, dehydrogenated derivatives thereof, and hydrogenated derivatives thereof.

3. A method claimed in claim 1, wherein the product is a compound of the formula:

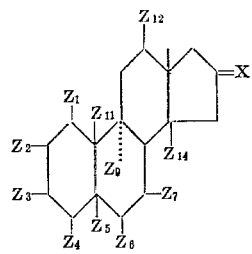

wherein X is an oxo group or a group

each represents a hydrogen atom, a hydroxyl group or, excluding $Z_5$, $Z_9$ and $Z_{14}$, represents an oxo group; configuration of $Z_1$–$Z_{14}$ may each be either $\alpha$ or $\beta$, except for $Z_9$ as $\alpha$; double bond may present at positions from 1 to 14.

4. A method claimed in claim 1, wherein the product is a compound of the formula:

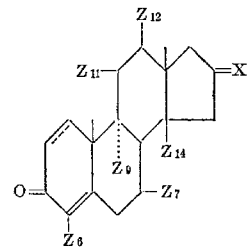

wherein $Z_6$–$Z_{14}$ and X have the same significances as defined above.

5. A method claimed in claim 1, wherein the product is a compound of the formula:

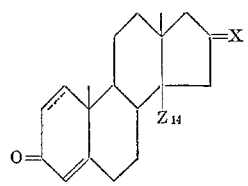

wherein X and $Z_{14}$ are the same as defined above.

6. A method claimed in claim 1, wherein the microorganism is selected from the group consisting of *Gymnoascus reessii, G. sudans, G. setosus, G. umbrinus, G. subumbrinus, G. brevisetosus, G. candidus, Scopulariopsis sphaerospora, S. fusca, S. rhodogena, S. capsici, S. alboflavescens, S. croci, S. rufulus, S. blochii, Hypomyces haematococcus, H. ipomoeae, H. rosellus, H. solani, Dendrostilbella byssina, D. baeomycioides, D. macrospora, D. prasinula* and mutants and variations thereof.

7. A method claimed in claim 1, wherein the process is carried out under aerobic condition.

8. A method claimed in claim 1, wherein the microorganism is one whose enzyme system has been strengthened or whose formation of adaptive enzyme promoted by the presence of an inducing agent in the reaction system.

References Cited

Mininger et al., Archives of Biochemistry and Biophysics, vol. 60, pp. 427–432 (1956).

ALVIN E. TANENHOLTZ, Primary Examiner

U.S. Cl. X.R.

260—397.45